US007611576B2

(12) United States Patent  
Rabiner

(10) Patent No.: US 7,611,576 B2
(45) Date of Patent: Nov. 3, 2009

(54) METHOD AND PLANT FOR PROCESSING WASTE

(76) Inventor: Yuriy Rabiner, 2 S. Pinehurst Ave. #3B, New York, NY (US) 10033

( * ) Notice: Subject to any disclaimer, the term of this patent is extended or adjusted under 35 U.S.C. 154(b) by 338 days.

(21) Appl. No.: 11/393,195

(22) Filed: Mar. 30, 2006

(65) Prior Publication Data

US 2007/0251433 A1 Nov. 1, 2007

(51) Int. Cl.
 *C04B 7/14* (2006.01)
(52) U.S. Cl. .................. 106/745; 106/789; 588/321
(58) Field of Classification Search .......... 106/789, 106/745; 588/321
 See application file for complete search history.

(56) References Cited

U.S. PATENT DOCUMENTS 6,202,577 B1 * 3/2001 Boguslavsky et al. ....... 110/346

* cited by examiner

*Primary Examiner*—Paul Marcantoni
(74) *Attorney, Agent, or Firm*—Jonathan Myers; Andrew Wilford

(57) ABSTRACT

A municipal or like refuse is crushing, mixing with crushed limestone, dry up in two stages—by hot air and by part of solid products of pyrolysis which other part goes on washing out and filtration. Pyrolysis is carried out in two stages—due to heat of the specified part of solid products of pyrolysis and simultaneous neutralization of allocated hydrogen chloride by limestone with reception of calcium chloride, and then due to heat of final chimney gases of the combustion chamber, where in three stages the washed solid products of pyrolysis preliminary drained by a part of combustion chamber slag are burnt together with liquid and gaseous products of pyrolysis. Gas allocated at pyrolysis condense and divide on organic, which is liquid fuel and water phases. Air after a dryer moves to blowing away of light organic substances from the specified water phase, is heated up due to heat of slag and moves in combustion chamber. Washing water goes on allocation of salts of heavy metals and calcium chloride, and slag after molding of a concrete mixture goes to the chamber of thermohumid processing of the slag concrete by a part of damp chimney gases after drying calcium chloride, other part of gases moves to manufacture of liquid carbon dioxide.

14 Claims, 4 Drawing Sheets

METHOD AND PLANT FOR PROCESSING WASTE

FIELD OF THE INVENTION

The present invention relates a method and a plant for processing waste, including solid municipal or like refuse and for processing the refuse together with oil-industry wastes (oil sludge, acid tars, etc.), soil polluted by pesticides and oil products, waste products of electronics, used tires, all kinds of plastics, sewage sludge from city waste water treatment plants, the polluted ground sediment of reservoirs, biologically polluted waste products of hospitals, etc.

BACKGROUND OF THE INVENTION

The problem of abating pollution in cities by their own solid municipal wastes is an extremely complex scientific-technical and socio-economic task. The specific problems include the fact that a large variety of pollutants may comprise the wastes, the fact that the waste products are produced by humans, and the fact that the quantities of these wastes are continuously increasing.

Economically the most attractive solution could be automated sorting of refuse with the subsequent recycling of a significant part of the refuse components into useful items of manufacture. However, such sorting is an extremely laborious, epidemically and toxically dangerous process allowing separation of no more than 30% of the refuse, as it is impossible to successfully separate out the bulk of the refuse. See Katys M. Dumps of Household Waste Products and Incinerate Factories—Sources of Dioxins. 25.11.2002 20:21 (www.svoboda.org).

Experience in Germany has shown, that recycling is economically expedient only for such materials as ferrous metals, aluminum, glass (depending on local conditions), and probably, paper and is completely unacceptable for plastic, packing materials, newspapers, waste products of electronics, linoleum, etc. (Steven P. Reynolds. The German Recycling Experiment and its lessons for United States Policy. Villanova Environmental Law Journal. Vol. V1, 1995, Number 1.). In the USA 30.6% of municipal solid waste is recovered through recycling (23.5%) and composting (7.1%) (U.S. EPA. Municipal Solid Waste in the United States. 2003 Facts and Figures). This figure of only 30$ means, that approximately 70% of solid waste be processed in a different way.

An emergency has developed all over the world concerning how to clean up oil containing waste products. Until now, a comprehensive solution to the problem, which includes—clearing of the ground repeatedly polluted with mineral oil (for example, decontaminating the ground in the area of gas stations, seaports, railway depots, tank farms, etc.), recycling of acid tars (waste products of sulfuric acid used in purification of some mineral oils, for example, lubricant oils, containing 15-70% of the sulfuric acid dissolved in water), cleaning up and removing ground sediments of oil tanks, ponds—sediment bowls, earthen sludge barns, forming a solid phase, containing paraffins, asphalt-resinous substances, sulfur, sand, clay and other mechanical impurities, and also heavy metals—lead, cadmium, zinc, etc. is not found. Such refuse is generally processed in a thermal neutralization plant where as a result of pyrolysis of the refuse, a dry carbon containing material is obtained useful as a raw material for the manufacture of building materials and asphalt concrete mixes, and also a condensate and a gas are obtained where the condensate and the gas used as fuel in these plants. See Zharov O. A., et al, Modern Russian Technologies. Vol. 2. Technologies and the Equipment for Processing and Recycling of Oil Containing Waste Products and Oil Sludges. The Directory. Ecoline. Yaroslavl, 2003). It is necessary to note that such a solution to the problem is not satisfactory as the solid residues of pyrolysis contain heavy metals and, hence, are not suitable for industrial use, and so a burial place for the residues is required. In addition it is impractical to extract oil from ground deposits in view of the high expenses and insignificant quantity of the oil phase: on the average 5-8%. A more rational way to solve the problem of how to clean up oil sludge would entail joint processing of residues of pyrolysis with municipal solid waste (Muzipov H. N., Nalobova E. V., Shantarin V. D. Utilization of Ground Sediment of Oil Tanks without Waste 21.01.2003 11:29/www.promeco.hl.ru). However, the questions associated with protecting the environment from pollution by heavy metals, polychlorinated dibenzodioxins, -furanes and -biphenyls also would still not be solved.

Throughout the world there are some technologies which jointly thermally process municipal solid waste and sludge deposits of the sewage formed in city sewage purification plants. As a result of jointly burning municipal solid waste and sewage sludge in furnaces of various designs with preliminary drying deposits obtained and a required return of chimney gases after drying the gases and deodorization of the gases in a furnace is provided (U.S. Pat. Nos. 4,753,181, 5,630,366, 6,412,428 and Kremer A. I. About Prospects of Joint Thermal Processing of Municipal Solid Waste and Deposits of Sewage. 26.11.2002 22:38/www.gke.wl.d-vgu.ru). In connection with the increased content of heavy metals in sludge deposits of sewage, all of these technologies result in obtaining extremely dangerous slag and ashes which require a burial place. Furthermore chlororganic compounds contained in the solid waste result in environmental contamination by such compounds, in particular, polychlorinated dibenzodioxins, -furanes and -biphenyls.

Today throughout the world there are more than ten technologies for processing solid municipal and industrial wastes. The most widespread among them are thermal processes: burning, pyrolysis and gasification.

Burning the wastes cannot be considered as the most economically sensible or conservation-minded method as many organic substances which could be recovered and put to good use, are burnt with additional consumption of fuel—up to $265\pi$ (70 gal) of fuel per ton of burnt solid waste (Clarke, M. J., DeKadt, M., and Saphire D. Burning Garbage in the USA. Practice vs. State of Art. Inform Inc. 1991. p. 146-147). Furthermore existing plants for refuse incineration have a lot of drawbacks, the main drawback is that while incinerating the wastes, they form secondary extremely toxic waste products (polychlorinated dibenzodioxins, -furanes, and -biphenyls) which are exuded together with heavy metals in an environment with chimney gases, sewage and slag. See Marjorie J. Clarke: Environmental Scientist Resource Recovery and Waste Disposal Planning. Minimizing Emissions from Resource Recovery. New York City Department of Sanitation; International Workshop on Municipal Waste Incineration. Sponsored by: Environment Canada. Meridien Hotel, Montreal, Quebec. Oct. 1-2, 1987. Second Edition; and L. A. Fedorov. Dioxins as Ecological Danger: Retrospective and Perspective. M. Nauka, 1993.-266 p. (www.seu/cci/lib/books/dioksiny).

As burning waste products provides warmth, the desire to use it for heating was natural. So movement: "Waste-to-Energy" has appeared (U.S. Pat. No. 5,862,762, Everett B. Woodruff, Herbert B. Lammers, Thomas F. Lammers. Steam Plant Operation. 7-th Edition. Division of the McGraw-Hill Companies, 1998. Chapter 13. Waste-to-Energy Plants, p. 729-774 and Joseph A. Salvato Nelson L. Nemerow, Franklin J. Acardy. Environmental Engineering. 5-th Edition. John Wiley and Sons, Inc. 2003. Chapter 5. Solid Waste Management, p. 755-888). However, burning of solid waste for the purpose of obtaining heat to manufacture electric power results in even greater environmental contamination. Since electric power consumption is not constant, but has daily and seasonal peaks that accordingly result in fluctuations of the required waste product load for the combustion chambers of garbage incineration boilers and, as a result lead to incompletely burning the waste products and to an even greater emission of harmful substances with chimney gases, slag, ash and sewage. For technical reasons only (low-calorie fuel, ineffective generators, etc.) the cost of the electric power generated by using the heat produced in municipal refuse incineration plants is not competitive with the cost of the electric power generated by using the heat produced in heat power stations. The price of one kilowatt generated by the heat produced in heat power stations 1-3 cents, and generated by the heat produced in refuse incineration plants—11 cents. Furthermore in view of the laws in force for stabilization of the market price of electricity to consumers many organizations that generate electric power are obliged to sell electricity for 2 cents for 1 kilowatt resulting in enormous losses for refuse incineration plants. In addition the necessity of providing a burial place for slag and ash further renders these plants absolutely unprofitable, and so financial forecasts for their development are extremely adverse (The Wall Street Journal. Aug. 11, 1993, p. A1-A2).

Many companies progress from simply burning refuse to a two-level process including a stage of pyrolysis (decomposition of organic substances without access of oxygen) at rather low temperatures 450-800° C. of. Such processes are energetically more favorable than simple burning. As a result of pyrolysis, the products obtained are pyrolysis gas and a solid residue of pyrolysis. These products may be sent at once without any additional processing to a combustion chamber for burning. A part of the gases of pyrolysis after condensation can be removed from the system and used as a liquid fuel by other consumers (U.S. Pat. Nos. 4,485,745 and 5,669, 317). However, the same drawbacks are observed as with the direct burning of waste products. In order to clear pyrolysis gas of acid gases such as chloride hydrogen (HCl), it is necessary to employ an expensive b process which becomes expensive because of the need to use expensive equipment and to use expensive caustic or calcinated soda. Furthermore environmental contamination by heavy metals is not eliminated.

An alternative to the process of pyrolysis is the process of gasification which proceeds similarly but at a temperature 800-1300° C. and in the presence of a small amount of air. In this case the obtained gas is a mixture of low-molecular hydrocarbons which is then burned in a furnace. Such a process does not improve the ecological situation because of the presence of air and the presence of chlorine-containing organic substances in the refuse, which in combination with high temperature results in intensive formation of chlorinated dioxins, furanes and biphenyls. In addition salts of heavy metals are not removed in the process and pollute the environment. See U.S. Pat. No. 5,445,087 and the Review of Modern Technologies of Reception of Liquid Fuel from Biomass by Fast Pyrolysis. 06.01.2003 21:59/www.scitecli-brary.com.

The most complete destruction of the environmentally hazardous products contained in refuse is carried out using high-temperature pyrolysis or gasification at a temperature of 1650-1930° C. fused in a mix of mineral additives with metal (U.S. Pat. No. 5,134,944), or at temperature up to 1700° C. (3100° F.) in a melt of salts or alkalis in a mix with additives and in the presence of catalysts (Ukraine Patent No 57984 A). The specified ways enable processing refuse of practically any composition as at such a temperature all dioxins, furanes and biphenyls are completely destroyed. As a result one obtains synthesis gas—a mix of hydrogen, methane, carbon monoxide, carbon dioxide, water steam, nitrogen oxides and sulfur, and a solid residue—coke, inorganic materials, namely, lime, cement, glass and slag which are poured out from the reactor in sealed bunkers. The solid residues form without any established industrial process for their further use and resulting in wasted melts of salts and metal whose regeneration is an extremely complex and power-intensive process requiring in addition a significant consumption of various reagents. Synthesis gas after enough complex decontamination can be used as fuel. It is necessary to note also that the specified processes do not provide removing of heavy metals and their salts from the solid residue of pyrolysis. Therefore any further application of slags obtained from those residues for manufacture of building materials and designs is impossible. Furthermore special measures on recycling the slags or a burial place are necessary.

The technology of processing of waste products on a basis of low temperature plasmas at 2000-100000° C. is applied basically to small volumes of especially dangerous waste products, for example, biologically polluted waste products of hospitals and differs from other technologies for processing wastes by the high cost of processing ($100 per ton of waste products) that practically excludes any real opportunity to apply this method on large industrial scales See Installation for Medical and Hazardous Waste Treatment Using the AC Plasma—Arc System Soliton—NTT with Institute of Problems of Electrophysics. http://soliton.msk.ru/hazard.html 12.21.2002.

The concentration of oxides of heavy metals in slag and ashes is 2-3 times (and sometimes more) higher than the concentration in burnt solid waste. Therefore, even though thermal methods allow considerably reducing the volume of waste products, the resulting ashes that are formed are even more dangerous to the environment and the slag formed requires special measures for recycling or a burial place. See Yufit S. S. Incinerate Factories—Rubbish Heap in the Sky Ecoline, 1998.

For processing of toxic slags the technology of ecological concreting is used: forming a mixture of slags after their neutralization with cement, lime or silicon dioxide with the subsequent hardening of the mix. If the waste products are correctly mixed with the cohesive agent "incapsulation" of the toxic substances occurs (including heavy metals and dioxins) in the cement stone which does not permit passing toxic substances into the environment. See U.S. Pat. Nos. 4,120, 735, 4,518,508, 5,286,430, 5,466,407, 5,649,894 and 6,342, 461. However, such technology requires preliminary neutralization of waste products employing several chemical reagents. A number of the substances forming waste products, for example, sulphur-containing substances can cause degradation of the cement stone that results in diffusion of contaminants into the environment. Besides, toxic metals under certain conditions can be washed away from the storage blocks by rains, for example, when there is a change of acidity of rain water according to "weather conditions". See Yufit S. S. Incinerate Factories—Rubbish Heap in the Sky. Ecoline, 1998.

An advanced method of ecological reconcreting, an integrated mineral-matrix technology, should provide ecological safety of the recovered material due to chemical bonding of contaminants down to their inclusion in a breaker plate creating a new cement formation (for example, heavy metals) or blocking of contaminants by colloid-disperse and sol-helium phases within the formed material. See U.S. Pat. Nos. 4,726,710, 4,741,776 and 4,872,954. However, it is possible only at rationally picked up components of system when potential chemical properties of components of system and their mechanical characteristics are established. See Knatko V. M., Knatko M. V., Scherbakova E. B. IMM—Technology Against Waste Products./Imitation of Natural Processes of Mineral Formation—a Perspective Direction of Neutralization and Recycling of Industrial Wastes. Energy: Economy, Technique, Ecology.—No 12, 2001, p. 29-35.

Commercially such condition cannot be established as the structure of the municipal refuse and accordingly of the slag is not constant. Thus, even the advanced technologies do not provide manufacture of non-polluting slag, suitable for further use. Furthermore the cost of a slag burial place is ten times higher than that of a burial place for municipal refuse.

It is necessary to note that in all patents which have been mentioned above directed to processes for hardening of slag-concrete mixes, it is stipulated that the temperature of the ambient air is the usual temperature. It is the extremely irrational to assume such an ambient temperature because it takes too long and reducing the ambient temperature forms turnaround delays in the release of finished goods. For acceleration hardening of concrete and for increasing physico—mechanical parameters of products, one must apply thermohumid processing—steaming in chambers by the wet saturated steam which creates the necessary thermal and damp inert environment, favorable for hardening of concrete. Modes of steaming are various and depend on the structure of concrete mixes, the optimum temperature for isothermal concrete warm up is 80-85° C., that provides after 8-20 hours the same durability which concrete obtains after aging for 28 days. See Bazhenov Y. M. Concrete Technology. Moscow, 1978, p. 205-229. However, such a way to reduce the production cycle, and to increase physico-mechanical parameters of products provides significant expenses for construction and operation of boiler-houses, the big charge of the steam reaching 1.2T on 1 m$^3$ concrete and, accordingly, of water and fuel (Dmitrovich A. D. Heat and Mass Exchange at Hardening of Concrete in the Steam Environment. Moscow, 1967).

Fuel production by pyrolysis of waste products is extremely important. In many cases it possible to replace oil with fuel obtained by pyrolysis of waste products, or to use a mix of them. All known processes provide preliminary sorting and classification of waste products with the subsequent pyrolysis of an organic part at various temperature ranges: 200-600° C. (U.S. Pat. No. 5,114,541), 315-565° C. (U.S. Pat. No. 4,153,514), 400-870° C. (U.S. Pat. No. 4,063,903), 430-730° C. (800-1350° F.) (U.S. Pat. No. 4,077,847) and burning of the solid residue of pyrolysis in furnaces of various designs. All these processes, however, lead to environmental contamination by toxic salts of heavy metals and are not suitable for processing the waste products containing polyvinyl chloride and other chlorine-containing plastics in connection with formation of polychlorinated dioxins, furanes and biphenyls. Furthermore after separation of a condensate of pyrolitic gas into fuel and water phases, additional complex water treating steps are required before the water phase can be dumped into the environment.

Three-stage burning processes developed for coal-fuel oil mazut and coal-dust boilers by Japanese companies Mitsubishi Heavy Industries, Inc. and Hitachi—Zosen (Development of MACT—in Furnace NOx—Removal Process for Utility Steam Generators/Y.

Takahashi e. a. //Proceeding of the American Power Conference. 1982. Vol. 44, p. 402-412 and Three-Stage Combustion System for Pulverized Coal Developed for Commercial Use/Y. Sekiguchi e. a. //Hitachi—Zosen Technical Review, 1982. Vol. 43, p. 95-104) and also three-stage burning for combustible solid waste are known. See U.S. Pat. Nos. 5,205,227 and 5,307,746. These methods allow lowering considerably emission of nitrogen oxides. However, these methods require careful preliminary sorting of municipal refuse because the methods are unsuitable for burning the waste products containing linoleum, plastic, batteries, accumulators and other materials including chlororganic substances and heavy metals. The slag and final chimney gases obtained from these waste products contain highly toxic dioxins, furanes, biphenyl and heavy metals.

The development of modern economically effective technologies for the thermal processing of municipal and similar waste products is necessary for achieving the maximal recycling of secondary power resources and above all for preliminary heating and drying of highly damp and frozen together waste products.

In U.S. Pat. No. 4,859,177 a furnace is disclosed for burning combustible waste products having a rotational device divided into a zone of drying and a zone of burning. Such integration of zones in one device provides economy of capital expenses at the time of construction. However, optimum efficiency of the furnace is possible only if waste products of constant humidity are processed so that the degree of recirculation of the final chimney gases in the rotational device and the temperature in a zone of burning of the furnace are balanced and constant. In the case where highly damp or frozen waste products are the combustible waste, and also where the combustible waste products are of variable humidity, the burning becomes chemically unstable, the waste products incompletely burn and, accordingly, the charge of fuel and emission of harmful substances into the atmosphere as well as into the slag sharply grows.

In Russian Patent No. model—35,257 a unit for pyrolysis of household waste products is described where a chamber of preliminary drying is designed as a bunker supplied with ripper and gas burners is powered by gas from the decomposition of waste products for heating the bunker up to 150-200° C. However, heating the bunker with gas obtained from the decomposition of waste products by an open flame results in local overheating and, accordingly, premature decomposition or premature ignition of waste products is possible. Furthermore obtaining final chimney gases from burners without recycling of heat and which are dumped directly into the atmosphere additionally pollute the environment and lead to the overexpenditure of fuel.

U.S. Pat. Nos. 5,052,313, 5,080,581 and 5,285,581 describe a way of processing of waste products of high humidity including preliminary dehydration in a mechanical device with subsequent heating and drying in a multisection dryer by final chimney gases from a furnace at the beginning of the process without contact with the environment, and then by direct contact of chimney gases with the waste products. The liquid educed from waste products in the mechanical device, concentrates in the evaporator due to recycling of heat leaving a dryer as a gas-vapor mixture; the concentrate goes to a dryer, and chimney gases after clearing in a scrubber are dumped in a chimney. Such method allows saving fuel and to obtain over regular intervals a wide range of dried up waste products before their feeding to a burning stage. However, it is impossible, to process the waste products, containing salts of heavy metals and chlorine organic substances as it is impossible to dump them into the atmosphere with slags containing polychlorinated dioxins, furanes, biphenyls and salts of heavy metals, and the condensate obtained after cooling of the gas-vapor mixture from a dryer needs complex clearing before dumping into the water drain.

In U.S. Pat. No. 5,231,936. drying and burning of highly damp combustible waste products are disclosed. Drying is carried out by final chimney gases obtained from the furnace. Air from a bunker initially holding refuse moves by use of a fan to a furnace for burning waste products that simultaneously destroys a part of foul-smelling gases. Drying the combustible waste products with final chimney gases reduces the discharge of fuel, however, direct contact of the environment results in pollution of chimney gases by foul-smelling gases from the combustible waste product and other harmful substances which then together with chimney gases are dumped in an atmosphere because the cyclone established before the chimney, entraps only a dust and soot substances.

In U.S. Pat. No. 4,542,703 a unit for burning waste products of any humidity is described including subsequent treatment of the gases that flow from the furnace following drying and burning of waste products and the afterburning in a chamber of products of incomplete combustion. Waste products move along an end face of the rotating furnace opposite to a burner and move towards to a stream of gases that provides in the beginning their drying, and then burning. Slag is unloaded from the furnace in the area of location of a burner, and chimney gases go in the afterburning chamber which burner provides a spiral stream of gases inside the chamber at a temperature of 1200° C. The afterburning chamber is established with the purpose of reduction of concentration of products of incomplete combustion including dioxins contained in the final chimney gases from the furnace that would enable burning the plastics and toxins in the chimney gases. However, in the Commoner's work (Commoner B. et al. Waste Management and Research 5:327-346, 1987) it is disclosed that upon inspection of incinerators it has been established that dioxins are formed during burning and that formation of them occurs also in a zone of cooling, therefore a rise in temperature at burning does not result to destruction of dioxins. It is established that emissions of products of incomplete combustion from a different sort of furnaces for combusting waste products do not decrease over changes of temperature from 700° C. up to 1600° C. (Trenholm A., Thurnay R. Proceedings of the Thirteen Annual Research Symposium. Cincinnati, Ohio: U.S. EPA Hazardous Waste Engineering Research Laboratory, EPA/600/9-87/015, Jule 1987). And, in addition, high temperatures result in increased volatility of components that lead to an increase in emissions of dangerous heavy metals. Thus, the method of reduction of concentration of dangerous substances by afterburning has no substantiation and is not capable to reduce emission of products of incomplete combustion and heavy metals.

U.S. Pat. No. 4,292,742 discloses a plant of preliminary drying of burnt fuel by a gas depleted in oxygen or other inert gas, for example, by nitrogen. The system of drying of fuel includes a circulating contour having a heater of air with a fluidized bed of cooled slag, a dryer with the fluidized bed of dried up fuel, a cyclone, a filter and a fan connected to one another by a system of pipelines. Effective operation of such a plant is possible only for materials homogeneous in composition, for example, fuel. For processing non-uniform, complex waste products in a composition where the municipal refuse has a high degree of ablation of light particles (a paper, a film, etc.), i.e. short residence time in the fluidized bed of a dried up material that will result having a final high moisture content of refuse, which will fast plug up the cyclone, the filter and the condenser with a damp material, which will stop the plant and require clearing to resume operation.

In U.S. Pat. No. 5,762,010 a way of processing waste products of any humidity is disclosed by providing preliminary heating of an intermediate heat-carrier (the ceramic spheres used simultaneously as the heat carrier and as the crushing agent), through utilization of heat from a process of pyrolysis with the subsequent separation of ashes from spheres in the punched part of a drum-type dryer. Then the specified spheres at a temperature of 750° C. are mixed with the initial waste products for drying them with simultaneous heating of air within a dryer. Steam is released from the waste products and mixes with hot air and moves to heat more of the initial waste products. A part of the gas of pyrolysis obtained without additional processing goes to a combustion furnace, and final chimney gases heat up the remaining part of gas of pyrolysis to a temperature of 750° C. which moves through the chamber of gasification for pyrolysis of waste products. Any surplus of the gas of pyrolysis is burnt in burners in the open air. However, this method is suitable only for processing of industrial residue with a content of dry substances no more than 10% when formed ashes is easily coarsely ground by spheres and then is eliminated on screens. Such processing of municipal waste products forms a stable fine grind slag and, accordingly, its separation on screens from the spheres is impossible so that what must often result is a stoppage of the equipment for cleaning. Use of surplus of gas of pyrolysis is not stipulated as a commodity fuel therefore; it is completely burnt in burners in the open air, wasting the energy content, and in addition, its combustion pollutes the environment, so that chemical neutralization of steam condensate from the dryer is necessary before dumping the condensate down a water drain. In addition processing waste products containing chlororganic substances and heavy metals, inevitably results in environmental contamination by dioxins, furanes, biphenyls and salts of heavy metals.

In U.S. Pat. No. 4,797,091 preliminary drying is provided of an organic part of sorted crushed waste products by air which has been heated up through recovery of heat from slag leaving a rotational furnace. The system of drying of waste products utilizes a circulating contour including a cooler of slag, a crusher of waste products, a pneumatic dryer and a cyclone connected among themselves by system of pipelines. Drying of waste products is carried out by direct contact with hot air in a vertical pipe of a pneumatic dryer. However, in plant removal of moisture from the heat-carrier or preliminary heating of cold damp refuse is not provided, so that upon their direct contact the temperature of the air can be reduced to its dew-point temperature which will result in drainage of air due to loss of condensate and, accordingly, to humidifying instead of drying of refuse. In the case of an increase of the flow of the hot air which excludes cooling the hot air to its dew-point temperature, consumption of the electric power for blasting sharply increases which is inherent in the operation of pneumatic dryers. Besides, to adjust the duration of drying and final moisture content of dried up refuse is practically impossible. Therefore non-uniformly dried up waste products enter into a reactor of pyrolysis that, accordingly, result in the overexpenditure of fuel in the pyrolysis process.

Thus, the problem of preliminary drying of municipal and similar waste products before their delivery for thermal processing has no satisfactory solution.

In U.S. Pat. Nos. 4,353,713, 4,448,558 and 4,597,771 processing of coal together with a light fraction of the municipal solid waste is described including preliminary sorting and crushing of the specified waste products their mixing with limestone, pyrolysis of the obtained mixture with the subsequent clearing of pyrolitic gas, allocation of some products, burning of the rest and use of heat of exothermal reactions between limestone or dolomite and carbon dioxide. These processes, however, lead to environmental contamination by toxic salts of heavy metals and are not suitable for processing of waste products of plastic, despite that limestone or dolomite could neutralize the hydrogen chloride discharged following decomposition of plastic hydrogen chloride (HCl). The calcium chloride recovered through such neutralization ($CaCl_2$) under conditions of high temperature in a gasifier 650-980° C. is in a melted condition (the melting temperature of $CaCl_2$ is 737-747° C. that results in sintering and lumping of processable waste products, in a sharp decrease of efficiency of contact with the environment so that the process of neutralization of hydrogen chloride is absolutely not effective and, hence, practically excludes any possibility of processing of plastic. The high temperature in the furnace 1090-1315° C. results in a fused product of salts of heavy metals, in general chlorides and sulfates, (temperature of fusion 242-915° C., and, above their surface exist in equilibrium with these melts their vapors. As the partial pressure of the vapors of these salts is not enough, they wind up in chimney gases carried away from the furnace in a chimney, and, due to their low concentration it is practically impossible to separate them from the gases though their total proportion in the gases represents a serious environmental issue. In slag also there are salts of heavy metals that exclude any opportunity of its further use.

In U.S. Pat. No. 6,202,577 processing of municipal and similar waste products is disclosed including removal from them of large metal objects followed by crushing and mixing with limestone. Pyrolysis of the specified mixture is carried out in two stages. The first stage is carried out—in a mixer located in a furnace, at a temperature of 240-260° C. and which includes heat recycling of part of the solid residue of pyrolysis when chlororganic compounds which are found in the refuse, decay with n liberation of hydrogen chloride (HCl) which reacts with crushed limestone and thus is led out from the process. The second stage is carried out at a temperature of 450-500° C. and includes utilization of heat from the chimney gases obtained from a combustion chamber located below. Thus polychlorinated dioxins, furanes and biphenyls are not formed in volume in the furnace because all chlorine has been removed from processable refuse at the previous stage of pyrolysis. Gas liberated during pyrolysis is condensed, and the organic portion of it, is liquid fuel and goes together with non-condensed gases to a combustion chamber. The water phase is fed to a stage for washing out salts of heavy metals and calcium chloride ($CaCl_2$) which formed by neutralization of hydrogen chloride (HCl). The washed out part of the solid products of pyrolysis after drying by mixing the solid products with hot slag is fed to a combustion chamber for burning. As a result the obtained slag does not contain heavy metals and sulfur. The preceding process has a number of essential disadvantages:

1. A process for preliminary drying of municipal refuse is not anticipated. It is known that a process of pyrolysis begins only then when water is completely evaporated and the temperature has achieved a critical value where decomposition of organics contained in the refuse takes place. This time period is a function of the humidity of the refuse at the beginning of the process and can take up to 30-40% of the length of the residence time of a waste material in the furnace of pyrolysis. Thus, the presence of moisture in refuse results in an increase in the residence time of waste products in the furnace of pyrolysis that essentially reduces its productivity, results in the overcomsumption of fuel and, accordingly, reduction in the out put of commodity fuel.

2. The municipal refuse contains different objects and materials including glass; the temperature interval at the beginning of its softening depends on the refuse composition, and is equal to 400-600° C. (750-1110° F.). Thus, cooling of slag using air having a temperature below the temperature specified will result in glass-transition and slagging of slag in the cooler and, accordingly, in a stoppage of work in the whole factory. Slag cooling at a temperature higher than the required temperature wastes a significant part of heat which results in the over-consumption of fuel in the combustion chamber and, accordingly, in a reduction of the output of fuel which can be marketed.

3. The solid products of pyrolysis after washing out in a scrubber have high humidity that require a large consumption of heat from the hot slag used for drying the solid particles in a mixer before feeding to a burning stage. As a result a significant amount of slag is recycled as ballast to the combustion chamber which complicates the burning out of combustible components of the solid product of pyrolysis, and results in the over-consumption of fuel and, accordingly, reduction of the output of fuel which can be marketed.

4. The manufacture of finished articles from slag is not a practical goal, which considerably reduces economic parameters of operation of the plant.

5. With the use of limestone during pyrolysis of municipal refuse to undergo a neutralization reaction with hydrogen chloride it is impossible to exclude a neutralization reaction with organic acids as well. Therefore to recover organic acids including acetic acid in significant quantities is impossible. In this connection instead of recovering organic acids it is more rational to carry out the pyrolysis to obtain liquid hydrocarbonic fuel.

6. The water contained within the damp refuse is removed during the process. Due to evaporation of a plenty of water in dryers of calcium chloride and dump water steams together with final chimney gases into an atmosphere the given technology has no sewage, however, a significant amount of additional fresh water is needed for cooling of slag by heat exchange with cool water before sending the slag to the consumer.

7. During neutralization of hydrogen chloride with limestone in the furnace of pyrolysis, calcium chloride is formed which then together with salts of heavy metals is extracting using wash water. After drying a part of this solution dry calcium chloride is obtained together with a concentrate of salts of heavy metals. Such a mixture is not a marketable product, it is necessary to first separate the calcium chloride from the heavy metals.

8. A complex and expensive preliminary clearing of harmful impurities (acids, sulfur compounds, etc.) is necessary for producing of liquid carbonic acid from gases of pyrolysis using chemical sorbents with subsequent clearing of the gas in electrofilters or by compressing the gas under high pressures with subsequent condensation and separation of impurities that renders production of carbonic acid economically unfavorable and, accordingly, does not reduce emission of carbon dioxide (CO2) into the atmosphere.

9. The joint burning in combustion chamber of liquid fuel, noncondensed gases of pyrolysis and solid products of pyrolysis is executed inefficiently what leads to significant emissions of nitrogen oxides into the atmosphere.

10. Direct contact between wash water and noncondensed gases of pyrolysis in a scrubber because of a difference in partial pressure of light organic substances in water and gas in the beginning results in enrichment by organic substances of the gas phase fed to combustion chamber, i.e. to blowing waters from light organic substances. Then taking into account that the quantity of these gases is not enough and also that in the gases there are products of incomplete condensation of organic substances that will collect and that will result in obtaining in a dryer calcium chloride water phase with an increased content of organic substances which, accordingly, will start the emissions of organic substances through a chimney as chimney gases into the environment.

11. For carrying out the process of pyrolysis the rotating drum furnace, including built—in devices for return of a part of a solid product of pyrolysis to the beginning of process and its mixture with an additional mix of waste products and with limestone is used. Such complex design of the furnace creates difficulties while in service including the need for stoppages for cleaning and repair.

Thus, for creation of the advanced highly effective technology and a plant for processing municipal and similar waste products it is necessary to exclude all drawbacks specified in the previous patents as discussed hereinabove.

SUMMARY OF THE INVENTION

The purpose of the invention—to create an economical method and plant for processing of wastes including a solid municipal waste or like refuse and also to recover from such specified waste products non-polluting marketable products: liquid fuel, dry calcium chloride, liquid carbonic acid, a concentrate of salts of heavy metals and slag-concrete products for the building industry.

The following purpose of the invention—to exclude emission into the environment of highly volatile and foul-smelling organic substances, carbon monoxide (CO) and salts of heavy metals, including radioactive metals, to reduce emission of carbon dioxide (CO2) and nitrogen oxides (NOX), to exclude formation of highly toxic polychlorinated benzodioxins, -furanes and -biphenyls by removing of air from the preparation block of waste products and its use at the first stage of drying of initial waste products under an underpressure with passage of noncondensed gases to a combustion chamber, gasifying of condensates using hot air and feeding then to a combustion chamber and burning the entire volume in the combustion chamber in three stages, and further including extraction salts of heavy metals from a solid product of pyrolysis, and neutralization in the first stage of pyrolysis of evolving hydrogen chloride by limestone.

The following purpose of the invention—to increase an output of a marketable liquid fuel as a result of reduction of its use in processing the waste material through a high level of recovering secondary waste heat, including heat of slag, heat from a solid product of pyrolysis, heat from pyrolitic gas, heat from final chimney gases from the combustion chamber and heat from dryers of calcium chloride, and centrifugal separation of the solid product of pyrolysis washed in an extraction unit.

The following purpose of the invention—to provide effective preliminary drying of municipal and similar waste products of any humidity including waste products frozen together by two-phase drying—first with hot air which has been heated up utilizing the heat of final chimney gases from a combustion chamber after those same chimney gases had heated the furnace of pyrolysis and then mixing the municipal and similar waste products of any humidity with a part of a solid product of pyrolysis.

The following purpose of the invention—to carry out separate manufacture of a concentrate of salts of heavy metals and dry calcium chloride by consecutive recovery of salts of heavy metals from wash water after an extraction at first, for example, utilizing sorbents and electrocoagulation, and then recovery of calcium chloride following drying in dryers utilizing the heat of final chimney gases from the combustion chamber.

The following purpose of the invention—to reduce the production cycle, to improve the physico-mechanical parameters of slag-concrete products by thermohumid treatment of those products by final damp chimney gases from the dryers of the calcium chloride where the gases contain as much as 100% relative humidity after mixing with moist saturated steam of low pressure from the heat recovery-boiler or with the vapor from a corresponding heating apparatus.

The following purpose of the invention—to reduce the consumption of water for technological needs by recycling to the process the condensate obtained following condensation of moisture from damp chimney gases obtained from the dryers of calcium chloride and cooled before production of carbon dioxide and obtained from the chamber for thermohumid treatment of slag concrete and also utilizing a part of the obtained solution of calcium chloride to accelerate the setting and hardening of concrete with a corresponding decrease in the amount of water needed for preparing a concrete batch.

The following purpose of the invention—to avoid stoppages of the plant for clearing and repair in connection with slagging of a slag cooler and breakdown of the recycling mechanism of pyrolysis furnaces by installation of a rotating drum cooler for the slag and pyrolysis product to make in two stages in consistently established neutralizer and the drum cooler and furnace of the pyrolysis connected to each other by an elevator and a screw feeder and via a path of gases of pyrolysis through a pipeline with a fan providing direct-flow movement to the environment from the furnace of pyrolysis.

More detailed explanation of the features mentioned above and other purposes and advantages is included in the detailed description of the invention together with the accompanying drawings.

Thus, the present invention provides a way to obtain non-polluting commodity products based on thermochemical processing of wastes (pyrolysis) and does not require any preliminary sorting. However, taking into account previous experience in Germany, including local conditions and economic reasons it is useful to carry out a preliminary separation of objects where recycling of those objects is expedient, for example, ferrous metals, aluminum and glass though the technology does not require any preliminary separation.

In carrying out the method for processing the humid waste material, such highly toxic substances as polychlorinated dibenzodioxins, -furanes and -biphenyls are not formed, and salts of heavy metals, including radioactive heavy metals, instead of release into the environment, are recovered as a concentrate. Atmospheric discharge of carbon monoxide (CO) is excluded, and volatile, foul-smelling organic substances are excluded too; in addition emission of carbon dioxide (CO2) is reduced in comparison with existing working plants by 64%, and nitrogen oxides (NOx)—by 60%.

The recycling system of heat released according to the process is maximized so that the process provides a coefficient of useful consumption of heat energy of a plant of 93.5% that together with manufacture of its own fuel allows not only to forego the use of fuel from the outside, but also to sell any unused quantity on the market. Only during the start-up period of a plant to process the humid solid waste material is it necessary to use earlier made fuel or fuel from external sources.

All stages of the process are not toxic, not a fire hazard and not explosive. The process is continuous and is fully automated, and allows effectively processing waste products of any humidity including waste materials frozen together.

There are no liquid and solid secondary waste products to further process as water and the water solutions formed in the process are consumed during the process and the slag cleared of heavy metals and sulfur is used in the manufacture slag-concrete products. The only production wastes are chimney gases which do not contain highly toxic components. Besides in connection with application of a thermohumid treatment to obtain slag and concrete products and depending on the composition the hardening time of concrete mixes is reduced 30 to 80 times, and there is an increase in the physico-mechanical parameters of slag concrete products. Furthermore the consumption of fuel is avoided thanks to heat utilization of the final chimney gases obtained from the combustion chamber and from the dryers of calcium chloride.

The capacity of the plant can vary within a wide range of parameters because it consist of separate technological lines in which the standard series-produced equipment is used only.

As a result of the calculations it is established, that after processing of one ton of municipal refuse of average composition the following commodity products are recovered: 110 kg of liquid fuel with a heat value about 8100 kcal/kg (14,500 Btu/lbm), liquid carbon dioxide and dry calcium chloride (more than on 30 kg of each product), up to 6 kg of a mix of salts of heavy metals and coke or coal (150 g actually salts), up to 300 kg of slag not containing a harmful impurity.

Liquid fuel is used for heating buildings and in power boilers. Liquid carbon dioxide—for carbonation of beverages, in welding practice, etc. Calcium chloride is applied to acceleration of concrete hardening, as deicer for roads, railway switches, regulation of coal and ores, in the preparation of refrigerant, medical products and in agriculture. Heavy metals are a raw material for the metallurgical industry. The slag cleared of heavy metals and sulfur is used in road construction and in manufacturing of slag concrete products.

BRIEF DESCRIPTION OF THE DRAWINGS

The above described and other purposes, prominent features and advantages will be more clear from the subsequent detailed description where are made references to drawings in which.

DETAILED DESCRIPTION OF THE INVENTION

Figure 1:
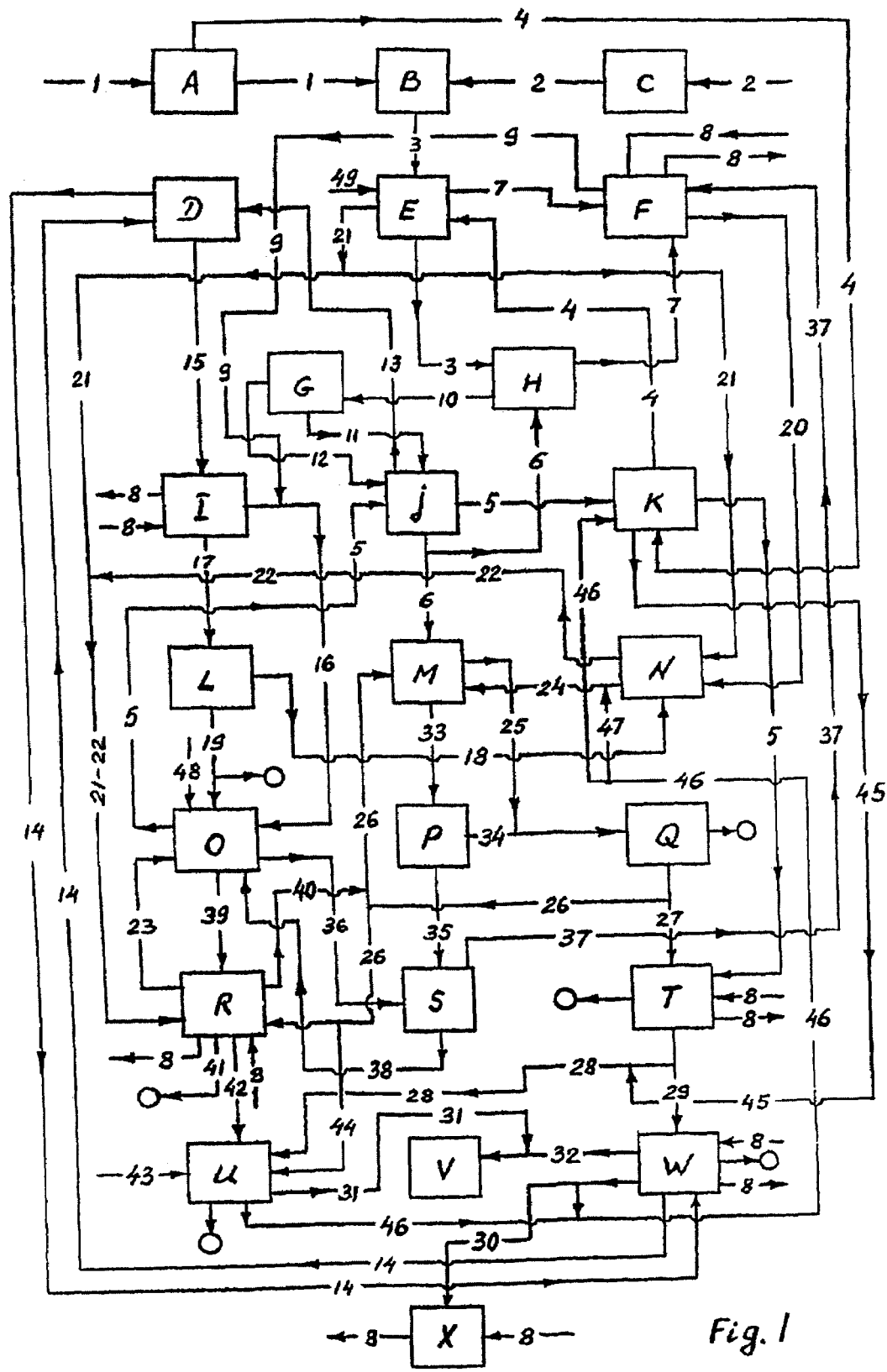
FIG. 1 is a block diagram of a method for processing of wastes.

In FIG. 1. a block diagram of a method for processing of wastes is shown. A municipal and similar solid waste 1 is fed to a waste preparation unit A where large objects which cannot be ground are removed. The present process does not require preliminary sorting of wastes; however, depending on local conditions and economic reasons it is useful to carry out a preliminary separation of objects where recycling of those objects is expedient, for example, ferrous metals, aluminium and glass may be recycled. Then the waste products are crushed until the size of the particles is no more than 10-15 mm (~½"). Simultaneously in a unit C one feeds crushed limestone through line 2. In a unit B one carries out mixing limestone powder with crushed waste products in a weight ratio depending on the content of the waste substances, capable to react with limestone and depending on the particular further use of slag obtained from a combustion chamber (unit O) and cooled in an unit R. In order to directly send cooled slag to the consumer a weight ratio of limestone to solid waste is required from 1:5 to 1:20 depending on the content of chlorine in the waste products. In the case where the cooled slag is obtained in a unit U to manufacture slag-concrete products one mixes in the unit B limestone in a quantity dependent on the mix formulation of concrete. When processing refuse together with other waste materials, for example, with acid tar, limestone is added in a quantity dependent on the content of sulfuric acid in the tar. The mix obtained for pyrolysis is subjected to a preliminary drying which is carried out in two stages. In the beginning via line 3 mixture moves to a unit E. The drying agent is air in line 4 which is led away from the waste preparation unit A and heated up in a unit K which utilizes the heat of final chimney gases up to a temperature no higher than 250 to 260° C. by chimney gases in line 5 going from the combustion chamber (unit O) after the chimney gases are used for heating a pyrolysis furnace (unit J). Such a low air temperature excludes local overheating and premature decomposition during the two drying stages (unit E) of chlorine-containing organic substances in the refuse, and warmed dryers heated through a surface of heat exchange exclude contact of air and refuse and, accordingly, prevent oxidation of the refuse which would result in pollution, and that allows separation of a water phase of liquid products of pyrolysis from contaminating organic substances. The consumption of air 4 is defined by the requirements of the burning process in the combustion chamber O, that provides its further full use, excludes emission of used air and, accordingly, excludes formation of organic and foul smelling substances and their release into the environment. The humidity of a mixture of refuse with limestone exiting the unit E depends upon the humidity of the initial refuse and the thermal balance of the system, i.e. the quantity of heat whose consumption can be strictly regulated and the air temperature going finally in the combustion chamber O. Following joint processing of refuse with waste products containing substances capable of immediately reacting with limestone and emitting the products of reaction into the environment, for example, acid tars containing up to 70% of sulfuric acid dissolved in water, move for processing via line 49 to an input in the unit E where the following reaction proceeds:

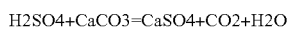

$$H2SO4+CaCO3=CaSO4+CO2+H2O$$

The optimum weight ratio of the refuse to the acid tars is from 5:1 to 10:1 depending on the content of sulfuric acid in the tars. Carbon dioxide (CO2) is separated and then along with moving of the mixture in a dryer and water vapor via line 7 enter a unit F and then noncondensible carbon dioxide via lines 9 and 16 goes in the combustion chamber O thereby excluding its dumping into the atmosphere. The formed calcium sulfate (CaSO4)—gypsum is obtained from the process together with slag from the combustion chamber O.

Finally the mixture of refuse with limestone is completely drained in a unit H by mixing with a part of the solid residue of pyrolysis 6 of the unit J (the furnace of pyrolysis), proceeding at a temperature of 450-500° C. When water is completely evaporated, the temperature of a mixture starts to rise quickly.

With the purpose of preventing premature decomposition of the organic substances the drained mixture moves further in to the block of pyrolysis at a temperature no more than 110-115° C. Released as vapor in both stages of drying (units E and H) water steams 7 are condensed through heat exchange in the unit F by recycled water 8 coming from the cooling tower (unit X) or the water used for heating and hot water supply of a plant (on the circuit it is not shown), and then by recycled water 8 of a specified cooling tower. Noncondensed gases via line 9 go to the afterburning and deodorization in the combustion chamber O. Such a two-stage method of drying allows the initial effective processing of refuse of any humidity including frozen waste products.

The process of pyrolysis also is carried out in two precisely divided stages. The first stage is carried out in a unit G without access to air where the incoming mixture 10 first of all is heated up. The consumption of the heat-carrier—the solid hot residue of the pyrolysis 6 coming from the unit J—furnace of pyrolysis—is adjusted so that the temperature of the mixture was set at a limit of 220-250° C., that provides a decomposition reaction of chlorine-containing organic components of refuse, for example, polyvinylchloride, linoleum, plastic, etc. by necessary heat, and also simultaneously protects the pyrolysis material from clogging and sticking to the walls of the equipment. Thus all chlorine contained in the refuse is converted to hydrogen chloride (HCl) which practically at the moment of formation reacts with limestone powder and thus is removed from the process with formation of calcium chloride (CaCl2):

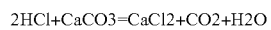

$$2HCl + CaCO3 = CaCl2 + CO2 + H2O$$

The second stage of pyrolysis is carried out also without access of air at a temperature of 450-500° C. in the unit J where dechlorinated solid 11 and gaseous 12 products of pyrolysis exit from a unit G. The process proceeds utilizing the heat from the chimney gases 5 entering from the combustion chamber O. Because the process is conducted without access of oxygen and because chlorine has been removed from the process during the first stage of pyrolysis, formation of chlorinated dioxins, furanes and biphenyls is prevented.

The solid residue of pyrolysis 6 goes from the furnace of pyrolysis J to a stage of extraction M which is carried out by washing out with hot water, water-soluble salts including salts of heavy metals. Gases of pyrolysis 13 enter a heat exchanger (unit D) where the hot gases heat up the high-temperature heat-carrier 14, for example, ethylene glycol, up to a temperature not lower than 150-160° C. employed then as the heat-carrier for a recovery stage of liquid carbon dioxide (unit W) from chimney gases. The cooled gases of pyrolysis 15 go to a stage of condensation (unit I) where they are condensed by recycled water 8 obtained from the cooling tower X. In case of perturbation of a technological mode or emergencies when ingress of sour gases is possible into a pyrolitic gas condensate, one can automatically inject in response to an indication of pH-meter of such a need a neutralizing solution 50, for example, a solution of caustic soda (NaOH). The non-condensed part of the pyrolitic gases 16 (methane, CO, CO2, etc.) go to burn in the combustion chamber O.

Condensed products of pyrolitic gases 17 are separated in a settler L into water 18 and organic 19 phases. The organic phase 19 is a high-calorific liquid fuel with a heat value ~8100 kcal/kg (14500 Btu/Lbm) which moves to the combustion chamber O. The surplus of the recovered liquid fuel goes to a storage facility.

The water phase 18 of liquid products of pyrolysis from the unit L together with a condensate 20 from the unit F go to a unit N where in a scrubber the organic substances soluble in water, basically acetone, are blown away from the water phase by a portion of hot air 21 after the hot air has heated a heating surface used for drying a mixture of municipal solid waste and limestone in the unit E. The temperature of incoming air is 105-110° C. The process is carried out utilizing the difference of partial pressure of the light organic substances in water and in air following their direct contact that results in enrichment of the air in organic substances. Then air 22 saturated by vapors of organic substances and moisture mixes up with the main stream of hot air 21 leaving the dryer E and is additionally heated up due to heat exchange with slag resulting in cooling of slag in the unit R to temperature 260-270° C. and moves to burn in the combustion chamber O via line 23.

Following the blow off of organic products, the water phase 24 from the unit N goes to a stage for washing off the solid residues of pyrolysis in an extractor (unit M). Thus the solid residues of products of pyrolysis in the beginning are cooled by water down to 80° C., and then during 1-1.5 hour while agitating with hot water there is a dissolution of calcium chloride (CaCl2) and extraction of ions of metals, including radioactive metals, from pores of solid particles. As far as calcium sulfate (CaSO4)—the gypsum obtained in processing of refuse together with acid tars dissolves poorly in water (~2 g/L of water), its hit in an end-product—calcium chloride as an impurity possible only in insignificant quantity (up to 1%). The optimum ratio of extraction water to the solid residues of pyrolysis is 2:1, that corresponds to a degree of the extraction of heavy metals more than 90%. Then the water together with the salts dissolved in it goes via line 25 into an unit Q where allocation of salts of heavy metals is carried out by known technique, for example, in two stages: in the beginning adsorption on coal or coke and then by electrocoagulation. The degree of extraction of heavy metals by such as method is not less than 99.9%. The heavy metals are separated in the unit Q as a concentrate go to a storage facility.

Cleared from salts of heavy metals, solution 26 containing calcium chloride again goes through extraction in the unit M. Part of a circulating solution (approximately 25%) are constantly picking out via line 27 into a unit T for recovery of dry calcium chloride. This process is carried out by a standard method using a spray dryer, a screw dryer and a cooler. Necessary heat is obtained using final chimney gases 5 after heating up of air 4 and obtaining moist saturated steam 45 in the heat recovery boiler of the unit K, and cooling by the recycled water 8 coming from the cooling tower X. The recovered dry solid calcium chloride goes to a storage facility.

The exhaust moist chimney gases 28 after drying calcium chloride (unit T) move into the unit U for manufacture of slag concrete products. A part of these gases via line 29 goes to achieve thermal balance of the system, i.e. with that quantity of heat which can be used to heat the high-temperature organic heat-carrier 14 heated up in the unit D to obtain liquid carbon dioxide (unit W). It is applied employing a standard absorption-desorption method with use of a solution of monoethanolamine. Chimney gases before isolating from them carbon dioxide (CO2) are cooled down to 35-40° C. (95-105° F.) by recycled water 8, the condensate separated at 30 is used for additional feeding of recycled systems of water supply to the extractor (unit M) and the cooling tower (unit X). The exhaust chimney gases of 31 and 32 of the units U and W are blown out in a chimney (unit V), and the liquid carbon dioxide goes to a storage facility.

Washed out in the extractor (unit M) solid products of pyrolysis 33 go to a filtration unit P (centrifugation). The filtrate 34 from a centrifuge mixes up with the extract 25 which has left the unit M and goes to a stage for separation of salts of heavy metals (unit Q).

The washed solid products of pyrolysis 35 after centrifugation in the unit P proceed to a unit S where they are dried by mixing with a part of the hot slag 36 leaving from the combustion chamber O. Water vapors 37 separated from the mixer-dryer S are condensed in the condenser F. From the mixer-dryer S the hot dry mixture 38 of solid pyrolysis products and slag enter the combustion chamber O for burning.

The slag 39 cleared of harmful impurities is cooled in the unit R down to 200° C. by air 21-22 and then to 70° C. The calcium chloride solution cleared of salts of heavy metals is cooled to 25-30° C. by recycled cooling water 8 coming from the cooling tower X. The calcium chloride solution 40 goes then to the unit M of extraction, and the slag via line 41—goes to a storage facility or is sent the consumer.

Depending on local conditions all of the slag or part of it may be used in the manufacture of slag concrete products in the unit U via line 42. There via line 43 all components necessary for making slag concrete may be mixed. The composition of mixes depends on local conditions, and can vary over a wide range and consist, for example, of slag, portland cement, gypsum and water (according to 260 kg, 37-87 kg depending on the type of cement, 1.5 kg and 23-27 L per 1 ton of refuse); slag, ground brick and, limestone in addition may be sent to a pyrolysis furnace and water (according to 260 kg, 100-150 kg, 50 kg and 80 L per 1 ton of refuse), etc. For acceleration setting and hardening of concrete calcium chloride (0.75-1.9 kg per 1 ton of refuse) is used as a solution of calcium chloride (10-12 L with a concentration of 9.7% $CaCl_2$) via line 44 moves in the unit U that in addition depending on the mix formulation reduces water consumption in the making of concrete by 15 to 45%.

For reduction of the production cycle, with an increase of physico-mechanical parameters of products, a possibility to use portland cement with its lowered activity, lime-sand mixtures and others low-activity astringent thermohumid processing of concrete is applied. The heating environment includes damp final chimney gases 28 remaining after the drying of calcium chloride (unit T). For attaining relative humidity of gases up to 100% in the stream of chimney gases 28 moist saturated steam of low pressure developed by the heat recovery boiler (unit K) is injected via line 45. In case of complexity of a choice of serially let out steam heat recovery boiler of required parameters it is used the vapor of mixer-dryers and extractor (on the circuit it is not shown). Recycling of waste final damp chimney gases reduces by 20-25 times the consumption of steam in comparison with the existing equipment, using steam for steaming concrete. A cycle of heat treatment: an increase in temperature of concrete products up to 80-85° C. within 2-3 hours, isothermal curing of concrete at the specified temperature for 4 hours and cooling 2-3 hours. Depending on the composition of concrete the cycle of heat treatment can easily be adjusted over a wide range. The exhausted chimney gases via line 31 are released through the chimney (unit V). Vaporized in the chamber of processing of concrete the condensate via line 46 returns to the heat recovery boiler of the unit K, and surplus of condensate goes for extraction in the unit M via line 47.

During start-up of the plant for warming up and stabilization of all streams, produced fuel or additional fuel (fuel oil or fuel gas) going into the unit O via line 48 is used preliminarily.

Figure 2:
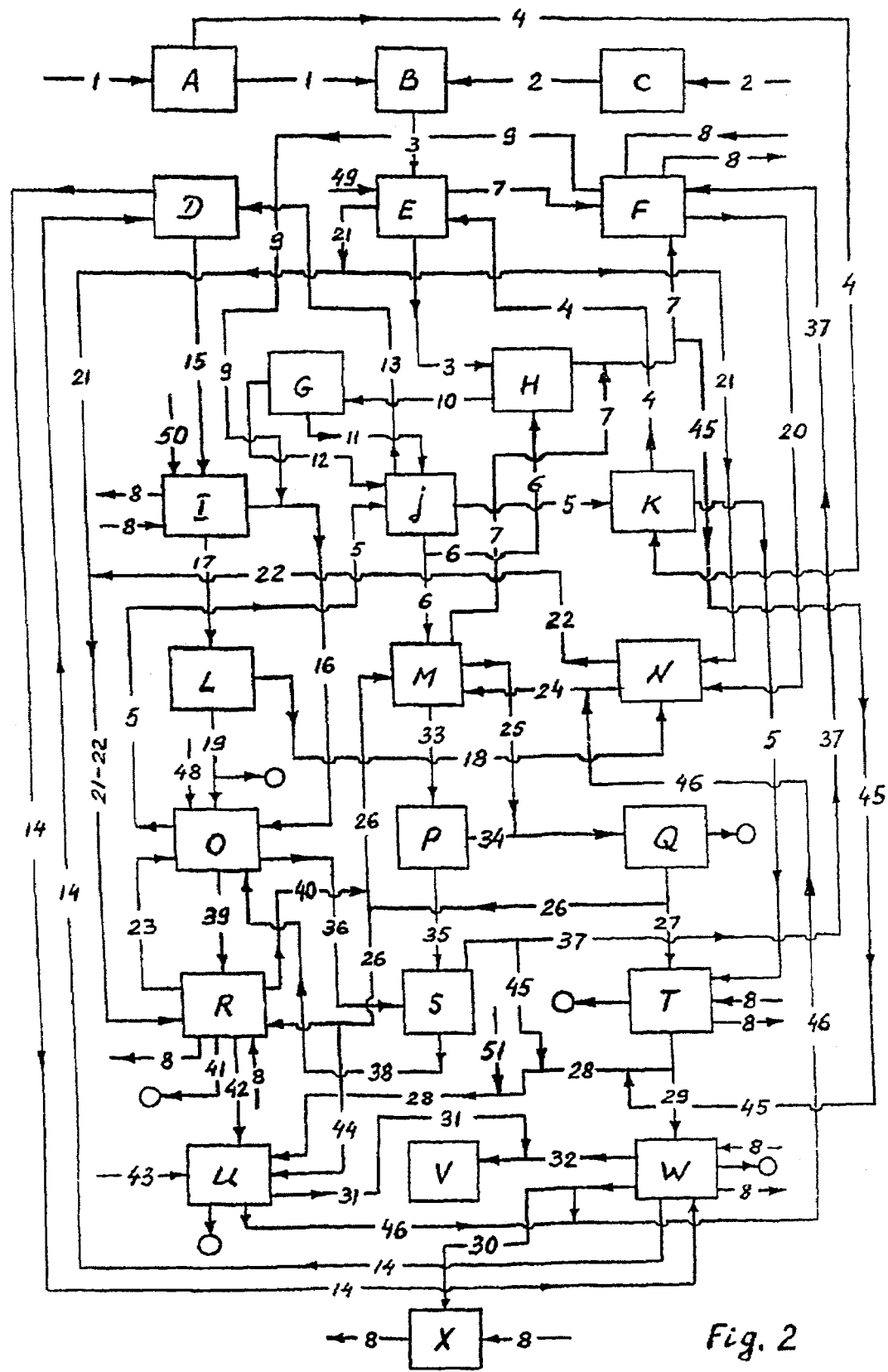
FIG. 2 is a block diagram of a method for processing of wastes without a heat-recovery boiler for receiving low-pressure moist saturated steam.

In FIG. 2 a block diagram of a waste-processing method without use of low-pressure moist saturated steam from the heat recovery is shown. Such a variant is necessary when the choice of the required parameters for the specified steam heat recovery boiler is complicated.

In this case for increasing the relative humidity of gases up to 100% in a stream of chimney gases 28 via lines 45 from lines 7 and 37, vapor of mixer-dryers (units H and S) and use an extractor (unit M). During startup and stoppage of a plant, and also in the case of infringement of a technological mode or emergencies, low-pressure steam 51 of the electric steam boiler is used. Such a decision considerably reduces the consumption of cooling water for condensation of the specified vapor in the condenser (unit F).

Figure 3:
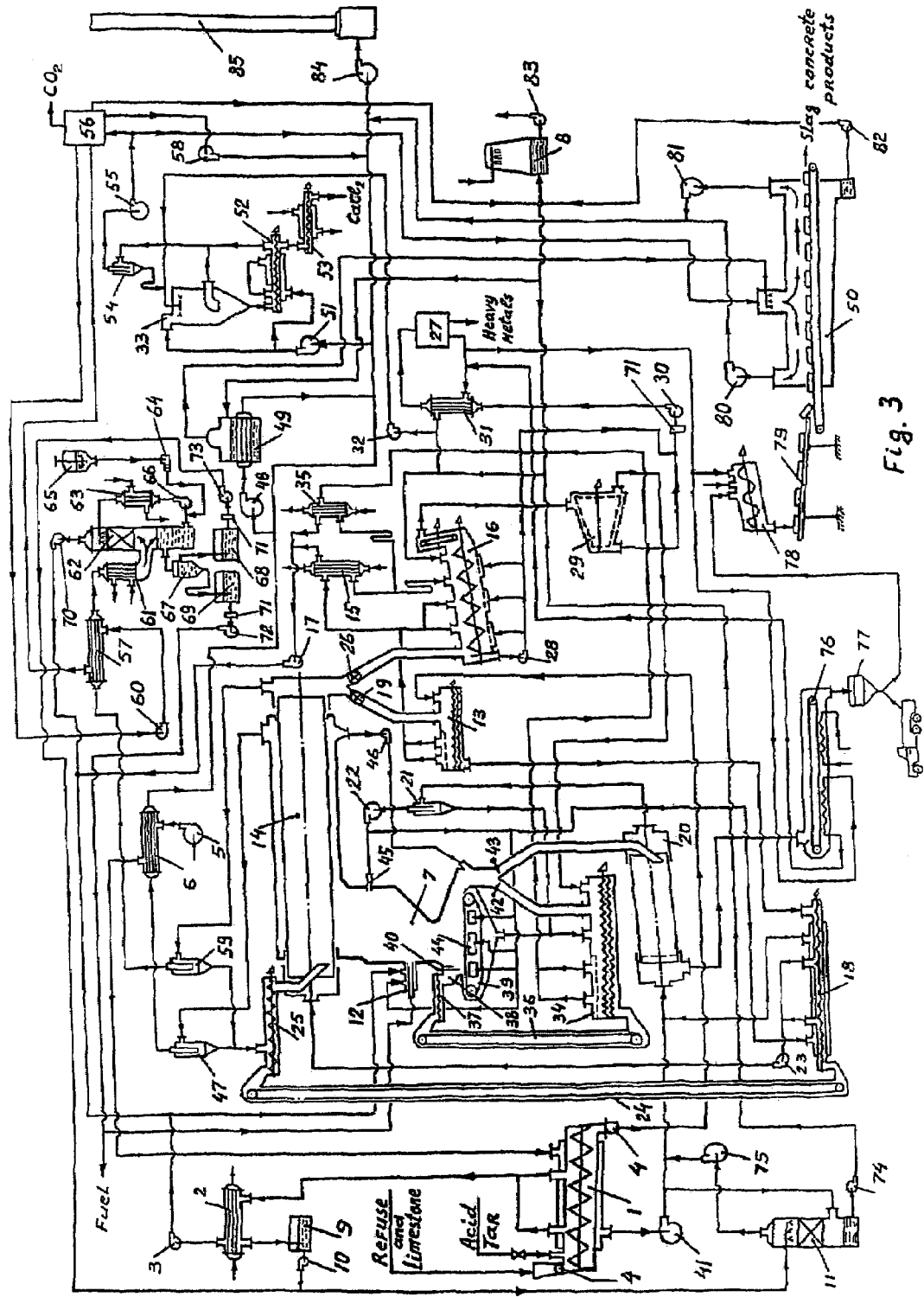
FIG. 3 is a flow diagram of one embodiment of a plant for processing wastes.

In FIG. 3, a flow diagram of one embodiment of a plant for processing wastes is shown. The plant works as follows. A mixture is prepared of crushed municipal or similar refuse with limestone powder (on the circuit it is not shown) and moved to a drying installation with a heat transfer surface, working under an underpressure of 2-10 mm of water column ($H_2O$) that excludes passage of foul smelling gases to the environment. When jointly processing refuse with waste products containing substances capable immediately of reacting with limestone and of emitting the products of reaction to the environment, for example, with acid tars containing up to 70% sulfuric acid, move for processing directly in a dryer 1 where they first of all are mixed with, and react with limestone, and then move along to a dryer, where they are dried. The installation consists of actually the dryer 1 supplied with a casing for a heat-carrier and an internal shaft with blades put on a screw line, a condenser 2 and a fan 3. At the input and output of a material from the dryer are installed drum feeders 4 playing a role not only as batch feeders, but also as gas sealers not permitting any external air leakage. For input of acid tars into the dryer it is preferable to employ an additional branch pipe with a regulating gate. Screw blades provide intensive agitating of the waste, uniform warming up of the waste, moving the waste along through the device and packing of the whole volume of waste. The dryer 1 is warmed with air circulated by a fan 5 from branch of preparation of refuse (on the circuit it is not shown) through an air heater 6 where it is heated up by the final chimney gases from a combustion chamber 7, up to a temperature of 250 to 260° C. Such a low air temperature excludes local overheating and premature decomposition in the dryer 1 of chlorine-containing organic substances and warming of the dryer through a heating surface excludes contact of refuse and air thereby avoiding formation of air pollutants. The blowing rate of air is set to equal the process requirements for the combustion process that takes place in the combustion chamber 7 and that provides sufficient air to fully combust the waste material, while excluding emissions to the atmosphere.

Water vapor leaving the dryer 1 is condensed in the condenser 2 by heat exchange with recycled water coming from a cooling tower 8 or with the water used for heating and hot water supply of the plant and then by heat exchange with recycled water from the specified cooling tower 8; condensate gathers in a tank 9 which by a pump 10 flows to a scrubber 11 to remove volatile organic impurities. Noncondensed gases are sucked away by the fan 3 and move to burners 12 in the combustion chamber 7.

The mix of refuse and limestone is dried in the dryer 1 up to an intermediate humidity level determined by the quantity of heat brought in by the hot air and the initial humidity of the refuse. Then the mix moves into a mixer-dryer 13, a device in which parallel horizontal shafts are rotated with blades put on a screw line. The drive shafts are supplied with speed rotation regulators. A separation device is installed to facilitate removal of vapor. During rotation of the shafts, agitating, uniform warming up, and transportation of the refuse and final removal of moisture from the refuse is carried out by mixing the refuse with a part of the solid residues of pyrolysis leaving the furnace of pyrolysis 14 at temperature of 450-500° C. After full removal of water the temperature of the mixture starts to rise quickly. To avoid decomposition in the mixer-dryer 13 of organic components in the refuse the completely drained mix is unloaded into a neutralizer 18 at a temperature no more than 110-115° C. and that is provided with shafts whose rotating speed is regulated inside the device. The water streams removed by a dryer are condensed in a condenser 15 by recycled water coming from the cooling tower 8; condensate moves to an extractor 16. Noncondensed gases by a fan 17 go to the burners 12 of the combustion chamber 7.

The first stage of pyrolysis is carried out without access of air in a neutralizer 18 which consists of a cylindrical case with branch pipes for an output of pyrolitic gases and a shaft built inside with blades put on a screw line. Outside a casing is provided for hot air supply. The incoming mix of refuse and limestone first of all is heated up. The heat-carrier consumption—the solid residue of the pyrolysis coming from the furnace of pyrolysis at a temperature of 450-500° C.—is adjusted by a drum feeder 19 so that the temperature of the mix in the neutralizer 18 is established at 220-250° C. to provide full decomposition of chlorine-containing organic components in the refuse. Besides the presence of the solid residues of pyrolysis protects the pyrolyzable material from clogging and sticking to the walls of the equipment. For compensation of losses of heat to the environment a part of the air which has been heated with a cooler of slag 20 up to temperature 260-270° C. after passage of the air to a cyclone 21 by a fan of hot blasting 22 moves by a countercurrent in a casing of the neutralizer 18 and then again is dumped into the cooler of slag 20. Thus when the constantly maintained temperature of the mix is not lower than 220° C. the first stage of pyrolysis is carried out: all chlorine contained in the refuse turns into hydrogen chloride (HCl) which there and immediately at the moment of formation, reacts with limestone powder forming calcium chloride (CaCl2) and thus all chlorine is removed by the process. Dechlorinated gases of pyrolysis, obtained in the neutralizer 18 move into the furnace of pyrolysis 14 by a forced draft fan 23. Dechlorinated solid products of pyrolysis by an elevator 24 and a screw feeder 25 also go to the furnace 14 where the second stage of pyrolysis of refuse proceeds.

The furnace of pyrolysis 14 is a drum rotating furnace externally heated by the chimney gases coming from the combustion chamber 7 located below. External and internal surfaces of the drum are supplied with spiral edges that increase the surface of heat exchange and intensify the process of pyrolysis by increasing the contact of the waste material with the heat exchange surface. The process proceeds in the absence of air at a temperature 450-500° C. For excluding of leakage of air and chimney gases into the chamber of the furnace of pyrolysis, it works under pressurization, i.e. under additional pressure of 5-15 mm of $H_2O$ created by the fan 23, to remove gases of pyrolysis from the neutralizer 18. Thus polychlorinated dibenzodioxins, -furanes and -biphenyls are not formed because the process is conducted in the absence of oxygen, and all chlorine has been removed from processable refuse during the previous stage of pyrolysis in the neutralizer 18.

The solid residues of the products of pyrolysis are removed from the furnace 14 and passed into the mixer-dryer 13 and into the extractor 16. The ratio of consumption depends on the temperature of a mix in the neutralizer 18 and is adjusted by the number of revolutions of the drums of the feeders 19 and 26. Washing of the solid residues of pyrolysis in the extractor 16 is carried out by water circulating through an installation 27 for separating the circulating water from heavy metals. Thus in the extractor during 1-1.5 hour agitating with hot water there is a dissolution of calcium chloride (CaCl2) and extraction of ions of metals, including radioactive, from pores of solid particles. In processing of refuse together with acid tars the formed gypsum practically is not dissolved in the wash water, but leaves from the extractor together with washed solid products of pyrolysis, goes into the combustion chamber 7 and is recovered from the process together with slag. The solid residues of pyrolysis go into the bottom part of the extractor whose chamber is inclined 10-15° to the horizon. A rotating screw moves up the solid phase to the top end of the extractor, mixing it with water, loosening and crushing the solid phase that creates a large surface of contact accessible for hot water to be added. Water enters at the opposite end of the extractor and after passage through all its length leaves through a netted baffle plate on the intake of a pump 28, a part of the water recirculates into the bottom of the extractor, in order to avoid formation of stagnant zones on its bottom. Other water with dissolved salts of heavy metals and calcium chloride together with a filtrate from a centrifuge 29 through a cartridge filter 71 by a pump 30 through a heat-exchanger 31 moves to the installation 27 for water treatment to remove salts of heavy metals in which a known, cheap and reliable combined method including water treatment with coal or coke with the subsequent electrocoagulation (on the circuit it is not shown). Such a process allows removing from the water solutions 99.9% of heavy metals contained therein.

Cleared from salts of heavy metals the solution is warmed up in the heat-exchanger 31 by a liquid leaving from the extractor 16 and the centrifuge 29 and circulated by the pump 30 and then the circulating solution again goes to the extractor 16. A part of the circulating solution (approximately 25%) moves by a pump 32 to a spray dryer 33 for recovery of the calcium chloride.

Water vapors leaving the extractor 16 are condensed in the condenser 15 by recycled water coming from the cooling tower 8, condensate comes back into the extractor 16. Noncondensed gases by the fan 17 move to the burners 12 of the combustion chamber 7.

The solid phase by the rotor device of the extractor 16 is unloaded to the bowl centrifuge 29 with automatic screw unloading of a sediment whose humidity depends on a division factor established for centrifuge 6-15%. The subsequent drying of the damp solid products of pyrolysis, from which heavy metal salts and calcium chloride have been washed, is carried out in a mixer-dryer 34 by mixing the damp solid products of pyrolysis with the hot ~1150° C. slag leaving from the combustion chamber 7. The design of the mixer-dryer 34 is similar to the design of the device 13. Water vapor leaving the mixer-dryer 34 is condensed in a condenser 35 by the recycled water coming from the cooling tower 8, and then the condensate goes to the extractor 16. Noncondensed gases by the fan 17 move to the burners 12 of the combustion chamber 7. The drained mix of the washed solid products of pyrolysis and slag at a temperature of 101-102° C. by an elevator 36 and a screw feeder 37 goes to a bunker 38 in the combustion chamber 7 located below the rotating furnace of pyrolysis 14.

In the combined grate-fired combustion chamber 7 gaseous and liquid products of pyrolysis of refuse are burnt, noncondensed gases from the condenser installations are deodorized and burnt. The solid washed out products of pyrolysis, basically carbon, are burnt in a layer on a moving chain-grate stoker of a direct course 39. The thickness of the layer is adjusted by a gate 40. While moving into the depth of the combustion chamber on a slowly movable grate bar surface, the solid products of pyrolysis are heated up, ignited and burnt up; then slag is dumped into the mixer-dryer 34 and the cooler of slag 20 where it is cooled by air forced by a fan 41. The ratios of consumption of slag in the air cooler 20 and the mixer-dryer 34 are adjusted by positioning of gates 42 and 43, and, the gate 42 enables such consumption of hot slag at which the temperature of the mix that is output from the mixer-dryer 34 is established as 101-102° C. that indicates about full removal of the moisture from the mixture deposited on the grate bar lattice 39 of the combustion chamber 7. The other part of slag goes in the cooler 20 where air which has been heated up to a temperature of 260-270° C. through the cyclone 21 by the fan 22 in each of zones is blow through blast tuyeres 44 under the grate bar lattice 39, into the burners 12 and air nozzles 45.

The work of the combustion chamber is carried out in a method of three-stage burning. This is method of decrease of nitrogen oxides emission differs that it does not reduce the formation of NOX, but restores already formed nitrogen oxides. The essence of the method consists that in the combustion chamber 7 is higher than the grate bar surface of lattice 39 the burners 12 working with lack of air (60-85% from stoichiometrical) are established. As a result products of incomplete combustion which serve as gases—reducers are formed. Interaction of these gases with the nitrogen oxide, formed during the burning of solid waste products of pyrolysis in a layer on the grate bar surface of the lattice 39 results in reduction of nitrogen oxides (NO) down to molecular nitrogen (N2). Regulation of air supply to the burners 12 is corrected depending on the content of nitrogen oxides in the final chimney gases of the combustion chamber 7. Above the burners 12 burning liquid and gaseous products of pyrolysis the nozzles 45 of sharp blasting are located through which air for afterburning products of incomplete combustion moves. Thus, the inside of the combustion chamber includes three burning zones: a zone of burning of the solid washed out residues of pyrolysis deposited on the grate bar of lattice 39, a zone of secondary burning reduction of nitrogen oxides down to molecular nitrogen and a zone of tertiary burning—afterburnings of products of incomplete burning from the second zone. Application of this method allows lowering emissions of nitrogen oxides (NOX) more than 60% in comparison with traditional methods of burning. In connection with the absence of oxygen carbon monoxide (CO) is formed in the furnace of pyrolysis 14 and so afterburning of the carbon monoxide is carried out in the combustion chamber 7 up to carbon dioxide (CO2). Neutralization of hydrogen chloride (HCl) formed during the first stage of pyrolysis excludes its inflow to the combustion chamber 7 and, accordingly, formation in the combustion chamber of chlorinated dioxins, furanes, and biphenyls is avoided. The part of solid products of the pyrolysis which falls through the grate bar, and is not burned gets in the bunker 38 located under the grate bar of lattice 39, and then through the mixer-dryer 34 by the elevator 36 and the screw feeder 37 again moves to the bunker 38 of the combustion chamber 7. The fine particles of soot, slag and ashes left behind in the furnace of pyrolysis 14 are then directed to a slag pocket of the combustion chamber 7 by a fan of ablation 46. Fuel from external sources is brought to the burners 12 only during the start-up period of the plant.

The final chimney gases of the combustion chamber 7 at a temperature of 1150-1250° C. go on to heat the furnace of pyrolysis 14 after which the chimney gases pass through a cyclone 47 where they are cleared from the dust carried away from the combustion. Dust collected in the cyclone 47 goes to the screw feeder 25 and then to the furnace of pyrolysis 14. From the cyclone 47 chimney gases at a temperature of 620-650° C. pass to the air heater 6 where heated up air, is used as the heat-carrier in the dryer 1 and then at a temperature of 450-470° C. by an exhauster 48 go to a heat-recovery boiler 49 for forming moist saturated steam, used in a chamber 50 of thermohumid processings of concrete. The final chimney gases of the heat recovery boiler 49 at a temperature 350-400° C. by an exhauster 51 move on for drying of a solution of calcium chloride, and, the major part of gases go to the spray dryer 33; the rest of gases go to a screw dryer 52 to finish drying of the solution. The blowing rate of gas on the devices 33 and 52 is supported automatically by a system of the block of ratio of streams which take into account the temperatures of the chimney gases as an output from the spray and the screw dryers—110° C. The initial solution with a concentration of 7-12% of calcium chloride (CaCl2) is evaporated in the spray dryer up to 50-70% of concentration and flows down in the screw dryer 52 where as a result of the heat of the chimney gases coming in the beginning in a jacket and then in a screw zone of the dryer itself, the calcium chloride is completely dried up to a residual humidity not more than 0.5% and then goes on to cooling in a screw cooler 53 and then unloading in a storage facility. Cooling is carried out by recycled water from the cooling tower 8.

The moist chimney gases after drying of calcium chloride go to a cyclone 54 where the gases are separated from carried away drops of a solution and by an exhauster 55 move into the chamber 50 for thermohumid processings of concrete and an installation 56 for manufacturing of carbon dioxide. This installation works by the standard absorption-desorption method of recovery of carbonic acid from the chimney gases with the help of monoethanolamine (on the circuit it is not shown). The quantity of the gases available for manufacturing of carbonic acid and, accordingly, the productivity of the installation is limited by the thermal balance of the system, i.e. that quantity of heat which can be applied for heating of a desorber of the installations 56 heated up in a heat exchanger 57, a high-temperature organic heat-carrier, for example, based on ethylene glycol. The condensate obtained by cooling of chimney gases from 110° C. down to 40° C. before an absorber of the installation 56 is used for additional supplying of a recycle system of water supply of the cooling tower 8 and other needs of the plant. The chimney gases cleared from carbon dioxide (CO2) by an exhauster 58 are dumped in the common gas flue of final chimney gases of the plant. Thus, the content of carbon dioxide in the chimney gases dumped in an atmosphere in comparison with factories using incinerators is reduced by more than 64% because part of the carbon remains in the liquid fuel, for sale on the commercial market; the given technology does not use additional fuel and a part of the formed carbon dioxide is manufactured as a carbonic acid commercial product.

The pyrolitic gas from the furnace 14 at a temperature 450-500° C. flows to a cyclone 59 where it is cleared from the dust, carried away, which is returned by the screw feeder 25 back into the furnace of pyrolysis 14. Then pyrolitic gas goes in the horizontal heat exchanger 57 where it heats up to temperature not less than 150-160° C. the high-temperature organic heat-carrier, for example, based on ethylene glycol which by a pump 60 moves to heat the desorber of the installation 56. Cooled down pyrolitic gas goes in a vertical tubular heat exchanger 61 where its condensation by recycled water from the cooling tower 8 and in a scrubber—chemisorber 62 for final condensation and clearing of gases and vapors is carried out by an irrigation of its own condensate cooled in a vertical heat exchanger 63 by recycled water from the cooling tower 8. In case of disturbance of a technological mode when an increase of acidity of a pyrolitic gas condensate is possible for neutralization of a sour impurity by a metering pump 64 from a tank 65 supplied with an anchor mixer automatically under an indication of pH-meter wherein a neutralizing solution is automatically introduced. Circulation of a condensate is carried out by a pump 66. Simultaneously the condensate from the scrubber—chemisorber 62 goes into a separated vessel (oil sump) 67 where it is separated into water and organic phases which accumulate in corresponding tanks 68 and 69. The noncondensed part of pyrolitic gas by a fan 70 goes on burning to the burners 12 of the combustion chamber 7. The organic phase of a condensate of a pyrolitic gas from the tank 69 through a cartridge filter 71 by a pump 72 in part goes as fuel to a fuel storage facility and in part—to the burning in the burners 12 of the combustion chamber 7. The water phase from the tank 68 through the cartridge filter 71 by a pump 73 moves to blow away the volatile organic substances in the scrubber 11 which is carried out by a part of hot air (~5%) supplied by the fan 41. The sediment from the cartridge filters 71 periodically during clearing pores filtering elements moves in the combustion chamber 7 (on the circuit it is not shown). The temperature of the air delivered to the scrubber is 105-110° C. (220-230° F.). After separating the great bulk of organic products, the water phase from the scrubber 11 by a pump 74 goes to a stage of washing of the solid residues of pyrolysis to the extractor 16. Air saturated with organic products and moisture by a fan 75 moves to mix with the main stream of air leaving the dryer 1. The mix of streams goes in the cooler of slag 20 where is heated up to a temperature of 260-270° C. (500-520° F.), passes through the cyclone 21 and by the fan 22 of hot blasting is dumped in the combustion chamber 7 and a casing of the neutralizer 18. Carried away by a stream of air fine particles of slag collected in the cyclone 21 and through the mixer-dryer 34 come back in the combustion chamber 7.

Slag from the combustion chamber 7 at a temperature of 1100-1150° C. goes into the drum cooler of slag 20. The drum is installed at an angle of 4-6° with respect to the horizon and rotates with a speed 3-6 rev/min. The motionless end face entrance of the slag cooler and 15-25% of the rotating drum length on the part of the input of slag, lined by the firebrick with fire resistance not less then 1300° C.; the other part is supplied with internal nozzles for pouring slag that helps its removal, the best air flow and crushing of the caked pieces. Owing to rotation of the drum, slag goes to it unloading end being cooled down to a temperature of 200° C. by air coming towards which is heated up from 105-110° C. up to 260-270° C. If required for the slag concrete products it is required in uniformly crushed slag, steel or ceramic spheres in diameter 100-150 mm are loaded into a cooler of slag 20 used as the crushing agent. The volume occupied by spheres makes 10-15% of working volume of the drum limited on the part of an output of slag by a cross lattice. Then slag gets in a scraper conveyer 76 located in the case supplied with surfaces of cooling in which the solution of calcium chloride cleared from salts of heavy metals and recycled water of the cooling tower 8 circulates cooling slag accordingly down to 65-70° C. and 25-30° C. The cooled slag cleared of heavy metals and sulfur moves to a bunker 77 where depending on local conditions, it is sent to the consumer or to manufacture the slag concrete products.

Installation for reception of slag concrete products includes a concrete mixer 78 where move slag and the solution of calcium chloride made by the given technology all necessary components deliver, for example, portland cement, ground broken bricks, gypsum, etc. received from external sources. The composition of mixes depends on local conditions and can vary over a wide range. The received mix goes for modeling and compaction on a vibration platform 79 and then moves in the chamber 50 of thermohumid processing of concrete products which represents the tunnel with the band conveyer located inside on which the concrete products formed earlier slowly move. For adjustment of speed of movement of a band the drive of the conveyer is supplied with a regulator of speed. Inside the tunnel is water-proofed and heat insulated. The floor is made with a bias aside pit for gathering a condensate. In the top part in the beginning and the end of the tunnel branch pipes for an exit of chimney gases and in the center—a branch pipe for an entrance of damp chimney gases entering from the dryers of calcium chloride 33 and 52 in a mix with moist saturated steam from the heat recovery boiler 49 are located. Exhausters 80 and 81 mounted on exits of chimney gases are supplied with axial directing devices and two speed electric motors that provide effective regulation of productivity in the big range of loading. The work of the chamber 50 is carried out as follows.

Simultaneously with loading of concrete products into the chamber, damp chimney gases are introduced at a temperature of 110° C. To reach a relative humidity of gases up to 100% moist saturated steam is injected from the heat recovery boiler 49. Thus, inside the chamber the damp inert environment capable to speed up all processes directed to the full maturing of concrete is established. Adjusting the productivity of the exhausters 80 and 81 inside the chamber, different intensities of streams of steam and gas mixes along the lines of particular concrete products are established and, accordingly, their temperature mode of heating, ageing and cooling is adjusted. The condensate recovered from a steam and gas mix goes in the pit of the chamber of processing of concrete and by a pump 82 moves to the extractor 16 and to a recycle system of the water cooling tower 8 supply. Circulation of water in the recycle system is carried out by a pump 83. The exhaust chimney gases are dumped in the flue duct of final gases of the plant and then by an exhauster 84 to a chimney 85.

Figure 4:
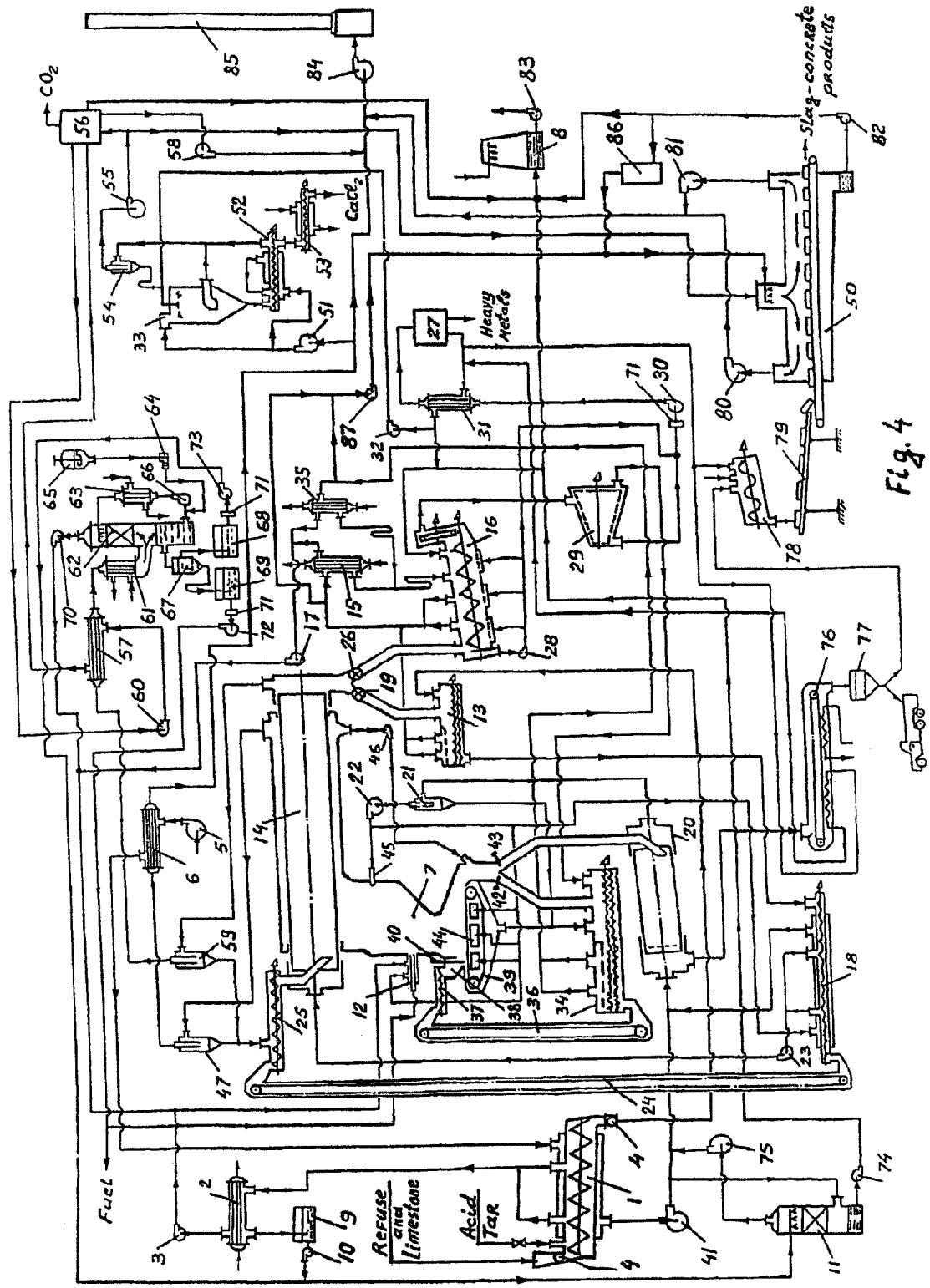
FIG. 4 is a flow diagram of a second embodiment of a plant for processing wastes without the heat recovery boiler for reception of the low pressure moist saturated steam.

In FIG. 4, a flow diagram of a second embodiment of a plant for processing wastes without the heat recovery boiler for obtaining the low pressure moist saturated steam is shown. Such a variant is necessary when the choice of serially manufactured steam heat recovery boiler of required parameters is complicated. In this case an electric boiler 86 of corresponding productivity connected by a system of pipelines on the part of an input of a condensate through the pump 82 with a pit of a condensate and on the part of an output of a steam with section of mixing of the chamber 50 of thermohumid processings of slag-concrete products is installed. The electric steam boiler 86 is intended for work during start-up and stoppage of a plant. During the established operating mode it is vapor from the mixer-dryers 13 and 34 and also from the extractor 16 which by a fan 87 moves in the chamber 50 of thermohumed processings slag-concrete products. Such decision considerably reduces the power inputs connected to manufacture steam and the consumption of cooling water on condensation of the vapor in the condensers 15 and 35.

I claim:

1. A method for processing a humid solid waste material, comprising the steps of:
   (a) removing larger objects that cannot be ground from the solid waste material;
   (b) optionally removing any ferrous metals, aluminum or glass from the solid waste material;
   (c) following steps (a) and (b), mixing the humid solid waste material with limestone powder in an amount sufficient to react with chlorine, present in the waste material, and grinding the mixture to a particle size no greater than 10 to 15 mm to form a pyrolyzable refuse product;

(d) drying the pyrolyzable refuse product in two drying stages, wherein in the first drying stage, the pyrolyzable refuse product is dried with hot air, at a temperature of 250 to 260° C., and at an underpressure of 2 to 10 mm of water, and removing water vapor from the first drying stage, and after moving the pyrolyzable refuse product from the first drying stage to the second drying stage, drying the pyrolyzable refuse product at a temperature of 450 to 500° C., to fully remove water vapor;

(e) pyrolyzing the dried pyrolyzable refuse product, following step (d), in two pyrolysis stages, wherein in the first pyrolysis stage, the pyrolyzable refuse product is pyrolyzed with the exclusion of air, at a temperature of 220 to 250° C., to convert the chlorine in the pyrolyzable refuse product to hydrogen chloride, which reacts with the ground limestone to form calcium chloride, and a dechlorinated pyrolysis gas, and wherein in the second pyrolysis stage, the dechlorinated pyrolysis gas is pyrolyzed at 450 to 500° C., at an overpressure of 5 to 15 mm of water, with the exclusion of air, to obtain a pyrolysis gas and a solid pyrolysis residue containing calcium chloride, heavy metal salts, and slag, and optionally calcium sulfate when acid tars containing sulfuric acid are initially present in the solid waste material;

(f) condensing the pyrolysis gas to obtain both a condensed pyrolysis gas and a non-condensed pyrolysis gas, recovering a portion of the condensed pyrolysis gas as a separate liquid fuel, and combusting the non-condensed pyrolysis gas and any condensed pyrolysis gas not separated as a liquid fuel, to produce hot chimney gases providing heat for the two-stage drying and two-stage pyrolyzing steps (d) and (e); and a hot slag product useful in the manufacture of concrete, and cooling down the hot slag product initially to a temperature of 200° C. and then to a temperature of 65 to 70° C. through contact with circulating cooling water;

(g) washing the solid pyrolysis residue obtained according to step (e), with an aqueous washing liquid, to dissolve the calcium chloride and heavy metal salts therein, and to obtain a washed solid pyrolysis residue, and extracting the calcium chloride and the heavy metal salts in aqueous solution from the solid pyrolysis residue, centrifuging the aqueous solution containing the calcium chloride and the heavy metal salts to separate out solid particles of pyrolysis residue from the aqueous solution, separating the heavy metal salts from the aqueous solution and recovering the heavy metal salts as a product, spray-drying the aqueous solution containing calcium chloride with a portion of the hot chimney gases produced according to step (f) to recover the calcium chloride as a product, desorbing carbon dioxide from the portion of the hot chimney gases used to spray-dry the calcium chloride, and recovering carbon dioxide as a product, separate from the heavy metal salts; and (h) channeling the washed solid pyrolysis residue to the combustion carried out according to step (f) so that the washed solid pyrolysis residue is combusted together with the non-condensed pyrolysis gas and any condensed pyrolysis gas not separated as a liquid fuel, to produce the hot chimney gases and the hot slag product.

2. The method of processing a humid solid waste material defined in claim 1 wherein the humid solid waste material includes both municipal refuse and oil industry waste including tar containing sulfuric acid, and wherein according to step (c) the limestone powder is added in an amount sufficient to react with the chlorine, present in the waste material, and sufficient to react with the oil industry waste including tar containing sulfuric acid.

3. The method of processing a humid solid waste defined in claim 1 wherein according to step (d) the hot air used to dry the pyrolyzable refuse product in the first drying stage is a portion of the hot chimney gases produced during the combustion in step (f), wherein the hot air heats a surface in heat exchange with the pyrolyzable refuse product such that direct contact between the hot air and the pyrolyzable refuse product is excluded, thereby preventing premature oxidation of the pyrolyzable refuse product, which will result in formation of pollutants, and wherein the drying in the second drying stage in step (d) is effected by contacting the pyrolyzable refuse product with a portion of the solid pyrolysis residue obtained according to step (e), to obtain the dried pyrolyzable refuse product.

4. The method of processing a humid solid waste material defined in claim 2, wherein following the drying of the calcium chloride with the hot chimney gases, the hot chimney gases, now moist, are combined with moist saturated steam, for obtaining moist gases with a relative humidity of 100% and which are used for thermohumid processing the slag obtained according to step (h) to obtain a slag concrete product.

5. The method of processing a humid solid waste material defined in claim 1, wherein according to step (c), the ratio of solid waste material to limestone is 1:5 to 1:20.

6. The method of processing a humid solid waste material defined in claim 2, wherein the weight ratio of the municipal refuse to the oil industry wastes including tar containing sulfuric acid is 5:1 to 10:1.

7. The method of processing a humid solid waste material defined in claim 1, wherein according to step (d) following the second drying stage the temperature of the dried pyrolyzed refuse product is dropped to 110 to 115° C., to prevent premature decomposition of organic substances in the dried pyrolyzable refuse product.

8. The method of processing a humid solid waste material defined in claim 1 wherein according to step (g) desorption of carbon dioxide from the hot chimney gas used to spray dry the calcium chloride is facilitated by heating a high temperature organic heat carrier through heat exchange with the pyrolysis gas produced according to step (e) and contacting the hot chimney gas with the high temperature organic heat carrier.

9. The method of processing a humid solid waste material defined in claim 1 wherein according to step (g), following the centrifugation of the aqueous solution containing the dissolved calcium chloride and heavy metal salts to separate out the solid particles of pyrolysis residue, the aqueous solution is filtered through a centrifuge filter.

10. The method of processing a humid solid waste material defined in claim 1, wherein according to step (h) the washed solid pyrolysis residue obtained according to step (g) is mixed with the hot slag product obtained according to step (f) to obtain a mixture of washed solid pyrolysis residue and hot slag product at a temperature of 101 to 102° C., which is then channeled back to the combustion of step (f).

11. A method for processing a humid solid waste material to obtain a liquid hydrocarbon fuel, metal salts, including heavy metal salts, and slag by removing larger objects that cannot be ground, mixing the humid solid waste material with limestone powder to form a mixture, grinding the mixture to form a pyrolyzable refuse product, pyrolyzing the refuse product to obtain a pyrolysis gas containing hydrocarbons and a solid pyrolysis residue containing calcium chloride, heavy metal salts and slag, condensing at least a portion of the pyrolysis gas to obtain a liquid hydrocarbon fuel, combusting at least a portion of the pyrolysis gas containing hydrocarbons to provide energy necessary for processing the humid solid waste material, separating the calcium chloride and the heavy metal salts from the slag and recovering a mixture of calcium chloride and the heavy metal salts and recovering the slag, the improvement which comprises at a point subsequent to forming the pyrolyzable refuse product, but before pyrolyzing the pyrolyzable refuse product, drying the pyrolyzable refuse product in two drying stages, wherein in the first drying stage, the pyrolyzable refuse product is dried by heat exchange with hot air, at a temperature of 250 to 260° C., and at an underpressure of 2 to 10 mm of water, and removing water vapor from the first drying stage, and after moving the pyrolyzable refuse product from the first drying stage to the second drying stage, drying the pyrolyzable refuse product at a temperature of 450 to 500° C., to fully remove water vapor.

12. The method defined in claim 11 wherein the hot air used to dry the pyrolyzable refuse product in the first drying stage is a portion of hot chimney gases produced during the combustion of at least a portion of the pyrolysis gas, wherein the hot air heats a surface in heat exchange with the pyrolyzable refuse product such that direct contact between the hot air and the pyrolyzable refuse product is excluded, and wherein the drying in the second drying stage is effected by contacting the pyrolyzable refuse product with a portion of the solid pyrolysis residue solid pyrolysis residue containing calcium chloride, heavy metal salts and slag.

13. The method defined in claim 11 which further comprises the step of recovering the calcium chloride and the heavy metal salts from the solid pyrolysis residue as separate products by washing the solid pyrolysis residue obtained according to step (e), with an aqueous washing liquid, to dissolve the calcium chloride and heavy metal salts therein, and to obtain a washed solid pyrolysis residue, and extracting the calcium chloride and the heavy metal salts in aqueous solution from the solid pyrolysis residue, centrifuging the aqueous solution containing the calcium chloride and the heavy metal salts to separate out solid particles of pyrolysis residue from the aqueous solution, separating the heavy metal salts from the aqueous solution and recovering the heavy metal salts as a product, and spray-drying the aqueous solution containing calcium chloride with a portion of the hot chimney gases produced according to step (f) to recover the calcium chloride as a product.

14. The method defined in claim 11 wherein the heat required for carrying out both the first drying stage and the second drying stage is derived solely from combusting at least a portion of the pyrolysis gas containing hydrocarbons.

* * * * *